United States Patent
Izawa

(10) Patent No.: US 6,442,333 B1
(45) Date of Patent: Aug. 27, 2002

(54) INFORMATION REPRODUCING APPARATUS

(75) Inventor: Toshiaki Izawa, Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/218,372

(22) Filed: Dec. 21, 1998

(30) Foreign Application Priority Data

Dec. 25, 1997 (JP) .............................................. 9-367156

(51) Int. Cl.$^7$ ................................................. H04N 5/92
(52) U.S. Cl. ............................. 386/95; 386/98; 386/97; 386/125
(58) Field of Search ................................ 386/1, 39, 40, 386/45, 95, 96, 98, 97, 99, 104, 105, 106, 125–126; H04N 5/76, 5/92, 5/91, 9/79, 5/781

(56) References Cited

U.S. PATENT DOCUMENTS

| | | | |
|---|---|---|---|
| 6,356,707 B1 | * | 3/2002 | Murase et al. ................. 386/95 |
| 2001/0014209 A1 | * | 8/2001 | Moriyama et al. ............. 386/95 |
| 2002/0003950 A1 | * | 1/2002 | Kashiwagi et al. .......... 386/125 |

\* cited by examiner

Primary Examiner—Thai Tran
(74) Attorney, Agent, or Firm—Pitney, Hardin, Kipp & Szuch LLP

(57) ABSTRACT

An information reproducing apparatus for reproducing record information from a record medium on which video information, a plurality of audio-information-streams and a plurality of character-information-streams are recorded, is provided with: a video information reproducing device; a first memory device for storing an attribute of the audio information to be reproduced; a second memory device for storing an attribute of the character information to be reproduced; an audio information reproducing device for reproducing the audio information in one of the audio-information-streams corresponding to the attribute stored in the first memory device; a character information reproducing device for reproducing the character information in one of the character-information-streams corresponding to the attribute stored in the second memory device; a superimposing device for superimposing the character information on the video information; an attribute distinguishing device for distinguishing the attribute of particular one of the audio-information-streams; and a superimpose controlling device for comparing the attribute stored in the first memory device and the attribute distinguished by the attribute distinguishing device with each other, and prohibiting the superimposing device to superimpose the character information if the compared attributes are coincident with each other.

8 Claims, 5 Drawing Sheets

| ADDRESS No. | CONTENT | | | NUMBER OF BYTES | TOTAL |
|---|---|---|---|---|---|
| | | | | | |
| 512 to 513 | VIDEO ATTRIBUTE | | | 2BYTES | 2BYTES |
| 514 to 515 | TOTAL NUBER OF AUDIO STREAMS | | | 2BYTES | 2BYTES |
| 516 | ADS#1 | Japanese | LINEAR PCM | 8BYTES | 64BYTES |
| 524 | ADS#2 | English | AC-3 | 8BYTES | |
| 572 | ADS#8 | French | LINEAR PCM | 8BYTES | |
| 596 to 597 | TOTAL NUBER OF SUB-PICTURE STREAMS | | | 2BYTES | 2BYTES |
| 598 | SPDS#1 | Japanese | RUN LENGTH COMPRESSION | 6BYTES | 192BYTES |
| 784 | SPDS#32 | French | RUN LENGTH COMPRESSION | 6BYTES | |

INFORMATION REPRODUCING APPARATUS

BACKGROUND OF THE INVENTION

1. Field of the Invention

The present invention relates to an apparatus for reproducing video information with superimposing subtitles thereon and also reproducing audio information related to the video information.

2. Description of the Related Art

As one example of such a kind of information reproducing apparatus, there is a DVD video player. According to the format of the DVD, it is allowed that 8 streams of audio information data (i.e., audio streams) can exist at the maximum, 32 streams of character information data (i.e., sub-picture streams) such as subtitles can exist at the maximum. The streams are differentiated from each other according to an attribute of the language (e.g., Japanese, English, French) and the like.

The DVD video player selects one of the above mentioned audio streams according to the attribute of the audio information and selects one of the sub-picture streams according to the attribute of the character information (subtitles) set by the user, so as to reproduce the selected streams. For example, by the user or the audience, when the attribute of the audio information is set to English and the attribute of the subtitles is set to Japanese, the audio stream whose attribute is English is selected out of the above mentioned 8 audio streams and the sub-picture stream whose attribute is Japanese is selected out of the above mentioned 32 sub-picture streams, so as to reproduce the selected streams.

By the way, according to the above mentioned information reproducing apparatus, since the audio stream and the sub-picture stream to be reproduced are selected according to the attributes set by the user in the above mentioned manner, a condition may happen which is unnatural in dependence upon the content of the video information to be reproduced. For example, in case that the user of the video player is Japanese, when he or she watches a Japanese movie (i.e., a movie in which main actors and actresses are Japanese, and the main language in their conversations is Japanese), unless there is any specific reason, it is natural or general that the audio information to be reproduced is set to Japanese without displaying any subtitles. However, if the Japanese movie is reproduced as the attribute of the audio information to be reproduced is continued to be English and the attribute of the subtitles is continued to be Japanese, the reproduced audio information (voice) becomes English and the Japanese subtitles are displayed.

Therefore, there is a problem that the attributes should be set again in accordance with the content of the information to be reproduced.

SUMMARY OF THE INVENTION

It is therefore an object of the present invention to provide an information reproducing apparatus, which can reduce the troublesome work to set again the attributes of the audio information and the subtitles with respect to the video information to be reproduced.

The above object of the present invention can be achieved by a first information reproducing apparatus for reproducing record information from a record medium on which video information, a plurality of audio-information-streams of audio information related to the video information and a plurality of character-information-streams of character information related to the video information are recorded as the record information. The first information reproducing apparatus is provided with: a video information reproducing device for reproducing the video information; a first memory device for storing an attribute of the audio information to be reproduced; a second memory device for storing an attribute of the character information to be reproduced; an audio information reproducing device for reproducing the audio information in one of the audio-information-streams corresponding to the attribute stored in the first memory device; a character information reproducing device for reproducing the character information in one of the character-information-streams corresponding to the attribute stored in the second memory device; a superimposing device for superimposing the character information on the video information; an attribute distinguishing device for distinguishing the attribute of particular one of the audio-information-streams; and a superimpose controlling device for comparing the attribute stored in the first memory device and the attribute distinguished by the attribute distinguishing device with each other, and prohibiting the superimposing device to superimpose the character information on the video information if the compared attributes are coincident with each other.

According to the first information reproducing apparatus, the attribute of the audio information to be reproduced is stored in the first memory device. The attribute of the character information to be reproduced is stored in the second memory device. The attribute of particular one of the audio-information-streams is distinguished by the attribute distinguishing device. Then, the attribute stored in the first memory device and the attribute distinguished by the attribute distinguishing device are compared with each other, by the superimpose controlling device. If the compared attributes are coincident with each other, the superimposing device is prohibited to superimpose the character information on the video information, by the superimpose controlling device.

At this time, since the audio information, which carries the original language related to the video information to be reproduced, is recorded in the particular one of the audio-information-streams, the superimpose controlling device prohibits the superimpose of the character information, which is to be the subtitles, onto the video information, in case that the attribute stored in the first memory device corresponds to the original language.

Namely, by storing the attribute corresponding to the mother tongue of the audience in the first memory device, the audio information in the audio stream carrying the original language is automatically selected and reproduced in case that the information to be reproduced (e.g., a movie) is produced mainly with the mother tongue of the audience, while the superimpose of the subtitles on the video information is prohibited. Therefore, it is possible to reduce the troublesome of setting the attributes again in accordance with the content of the information to be reproduced.

In one aspect of the first information reproducing apparatus, the first information reproducing apparatus is further provided with a specifying device for specifying a reproduction mode including an automatic selection reproduction mode. And that, the superimpose controlling device allows the superimposing device to superimpose the character information regardless of a result of comparison of the attributes if the automatic selection reproduction mode is not specified by the specifying device.

According to this aspect, when the automatic selection reproduction mode is not specified by the specifying device, the superimposing device is allowed by the superimpose controlling device to superimpose the character information regardless of the result of comparison of the attributes.

Therefore, when the automatic selection reproduction mode is not specified by the specifying device, it is possible to perform the superimpose of the character carrying a language in favor of the audience.

In another aspect of the first information reproducing apparatus, the particular one of the audio-information-streams is an audio-information-stream, which has a stream number 1, among the audio-information-streams.

According to this aspect, the particular one of the audio-information-streams is the audio-information-stream of the stream number 1. Since the audio-information-stream of the stream number 1 is conventionally a stream for carrying the original language of the record information (e.g., a movie) to be reproduced, it is possible to substitute the attribute of the audio-information-stream of the stream number 1 for the attribute information indicating the production place of the record information to be reproduced.

The above object of the present invention can be also achieved by a second information reproducing apparatus for reproducing record information from a record medium on which video information, a plurality of audio-information-streams of audio information related to the video information and a plurality of character-information-streams of character information related to the video information are recorded as the record information. The second information reproducing apparatus is provided with: a video information reproducing device for reproducing the video information; a first memory device for storing an attribute of the audio information to be reproduced; a second memory device for storing an attribute of the character information to be reproduced; an audio information reproducing device for reproducing the audio information in one of the audio-information-streams corresponding to the attribute stored in the first memory device; a character information reproducing device for reproducing the character information in one of the character-information-streams corresponding to the attribute stored in the second memory device; a superimposing device for superimposing the character information on the video information; an attribute distinguishing device for distinguishing the attribute of particular one of the character-information-streams; and a superimpose controlling device for comparing the attribute stored in the first memory device and the attribute distinguished by the attribute distinguishing device with each other, and prohibiting the superimposing device to superimpose the character information on the video information if the compared attributes are coincident with each other.

According to the second information reproducing apparatus, the attribute of the audio information to be reproduced is stored in the first memory device. The attribute of the character information to be reproduced is stored in the second memory device. The attribute of particular one of the character-information-streams is distinguished by the attribute distinguishing device. Then, the attribute stored in the first memory device and the attribute distinguished by the attribute distinguishing device are compared with each other, by the superimpose controlling device. If the compared attributes are coincident with each other, the superimposing device is prohibited to superimpose the character information on the video information, by the superimpose controlling device.

At this time, since the character information, which carries the original language related to the video information to be reproduced, is recorded in the particular one of the character-information-streams, the superimpose controlling device prohibits the superimpose of the character information, which is to be the subtitles, onto the video information, in case that the attribute stored in the first memory device corresponds to the original language.

Namely, by storing the attribute corresponding to the mother tongue of the audience in the first memory device, the audio information in the audio stream carrying the original language is automatically selected and reproduced in case that the information to be reproduced (e.g., a movie) is produced mainly with the mother tongue of the audience, while the superimpose of the subtitles on the video information is prohibited. Therefore, it is possible to reduce the troublesome of setting the attributes again in accordance with the content of the information to be reproduced.

The above object of the present invention can be also achieved by a third information reproducing apparatus for reproducing record information from a record medium on which video information, a plurality of audio-information-streams of audio information related to the video information and a plurality of character-information-streams of character information related to the video information are recorded as the record information. The third information reproducing apparatus is provided with: a video information reproducing device for reproducing the video information; a first memory device for storing an attribute of the audio information to be reproduced; a second memory device for storing an attribute of the character information to be reproduced; an audio information reproducing device for reproducing the audio information in one of the audio-information-streams corresponding to the attribute stored in the first memory device; a character information reproducing device for reproducing the character information in one of the character-information-streams corresponding to the attribute stored in the second memory device; a superimposing device for superimposing the character information on the video information; an attribute distinguishing device for distinguishing the attribute of particular one of the audio-information-streams; a comparing device for comparing the attribute stored in the first memory device and the attribute distinguished by the attribute distinguishing device with each other; and a reproduction controlling device for controlling the audio information reproducing device to reproduce the audio information in the particular one of the audio-information-streams if the compared attributes are not coincident with each other according to a comparison result of the comparing device.

According to the third information reproducing apparatus, the attribute of the audio information to be reproduced is stored in the first memory device. The attribute of the character information to be reproduced is stored in the second memory device. The attribute of particular one of the audio-information-streams is distinguished by the attribute distinguishing device. Then, the attribute stored in the first memory device and the attribute distinguished by the attribute distinguishing device are compared with each other, by the comparing device. If the compared attributes are not coincident with each other, the audio information reproducing device is controlled by the reproduction controlling device to reproduce the audio information in the particular one of the audio-information-stream.

At this time, since the audio information, which carries the original language related to the video information to be reproduced, is recorded in the particular one of the audio-information-streams, the reproduction controlling controls the audio information reproducing device to selectively reproduce the audio information in the particular one of the audio-information-stream, in case that the attribute stored in the first memory device does not correspond to the original language.

Namely, by storing the attribute corresponding to the mother tongue of the audience in the first memory device, the audio information in the audio stream carrying the original language is automatically selected and reproduced in case that the information to be reproduced (e.g., a movie) is not produced mainly with the mother tongue of the audience, while the superimpose of the subtitles on the video information is performed. Therefore, it is possible to reduce the troublesome of setting the attributes again in accordance with the content of the information to be reproduced.

In one aspect of the third information reproducing apparatus, the particular one of the audio-information-streams is an audio-information-stream, which has a stream number 1, among the audio-information-streams.

The above object of the present invention can be also achieved by a fourth information reproducing apparatus for reproducing record information from a record medium on which video information, a plurality of audio-information-streams of audio information related to the video information and a plurality of character-information-streams of character information related to the video information are recorded as the record information. The fourth information reproducing apparatus is provided with: a video information reproducing device for reproducing the video information; a first memory device for storing an attribute of the audio information to be reproduced; a second memory device for storing an attribute of the character information to be reproduced; an audio information reproducing device for reproducing the audio information in one of the audio-information-streams corresponding to the attribute stored in the first memory device; a character information reproducing device for reproducing the character information in one of the character-information-streams corresponding to the attribute stored in the second memory device; a superimposing device for superimposing the character information on the video information; an attribute distinguishing device for distinguishing the attribute of particular one of the audio-information-streams; and a controlling device for comparing the attribute stored in the first memory device and the attribute distinguished by the attribute distinguishing device with each other, prohibiting the superimposing device to superimpose the character information if the compared attributes are coincident with each other and allowing the audio information reproducing device to reproduce the audio information in the particular one of the audio-information-streams if the compared attributes are not coincident with each other According to the fourth information reproducing apparatus, the attribute of the audio information to be reproduced is stored in the first memory device. The attribute of the character information to be reproduced is stored in the second memory device. The character information having the attribute stored in the second memory device is reproduced by the character information reproducing device. The character information is superimposed on the video information by the superimposing device. The attribute of particular one of the audio-information-streams is distinguished by the attribute distinguishing device. Then, the attribute stored in the first memory device and the attribute distinguished by the attribute distinguishing device are compared with each other, by the controlling device. Then, as a result of the comparison, if the compared attributes are coincident with each other, the superimposing device is prohibited to superimpose the character information. Alternatively, if the compared attributes are not coincident with each other, the audio information reproducing device is controlled by the controlling device to reproduce the audio information in the particular one of the audio-information-streams.

At this time, since the audio information, which carries the original language related to the video information to be reproduced, is recorded in the particular one of the audio-information-streams, the superimpose of the character information on the video information is prohibited in case that the attribute stored in the first memory device corresponds to the original language. On the other hand, the audio information reproducing device is controlled to selectively reproduce the audio information in the particular one of the audio-information-streams in case that the attribute stored in the first memory device does not correspond to the original language.

Namely, by storing the attribute corresponding to the mother tongue of the audience in the first memory device, the audio information in the audio stream carrying the mother tongue language is automatically selected and reproduced while the superimpose of the subtitles on the video information is prohibited in case that the information to be reproduced (e.g., a movie) is produced mainly with the mother tongue of the audience. On the other hand, the audio information in the audio stream carrying the original language is automatically selected and reproduced while the superimpose of the subtitles on the video information is performed in case that the information to be reproduced (e.g., a movie) is not produced mainly with the mother tongue of the audience. Therefore, it is possible to reduce the troublesome of setting the attributes again in accordance with the content of the information to be reproduced.

In one aspect of the fourth information reproducing apparatus, the particular one of the audio-information-streams is an audio-information-stream, which has a stream number 1, among the audio-information-streams.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2 is a diagram showing a VTSI information management table on the DVD of FIG. 1;

DETAILED DESCRIPTION OF THE PREFERRED EMBODIMENTS

Referring to the accompanying drawings, an embodiment of the present invention will be now explained. In the present embodiment, an optical disc which meets the video standard of the DVD is employed.

Before explaining an embodiment of the information reproducing apparatus according to the present invention, an outline of the data structure of application data on the video standard of the DVD, which is reproduced by the embodiment of the information reproducing apparatus, is explained with reference to FIG. 1 and FIG. 2.

Figure 1:
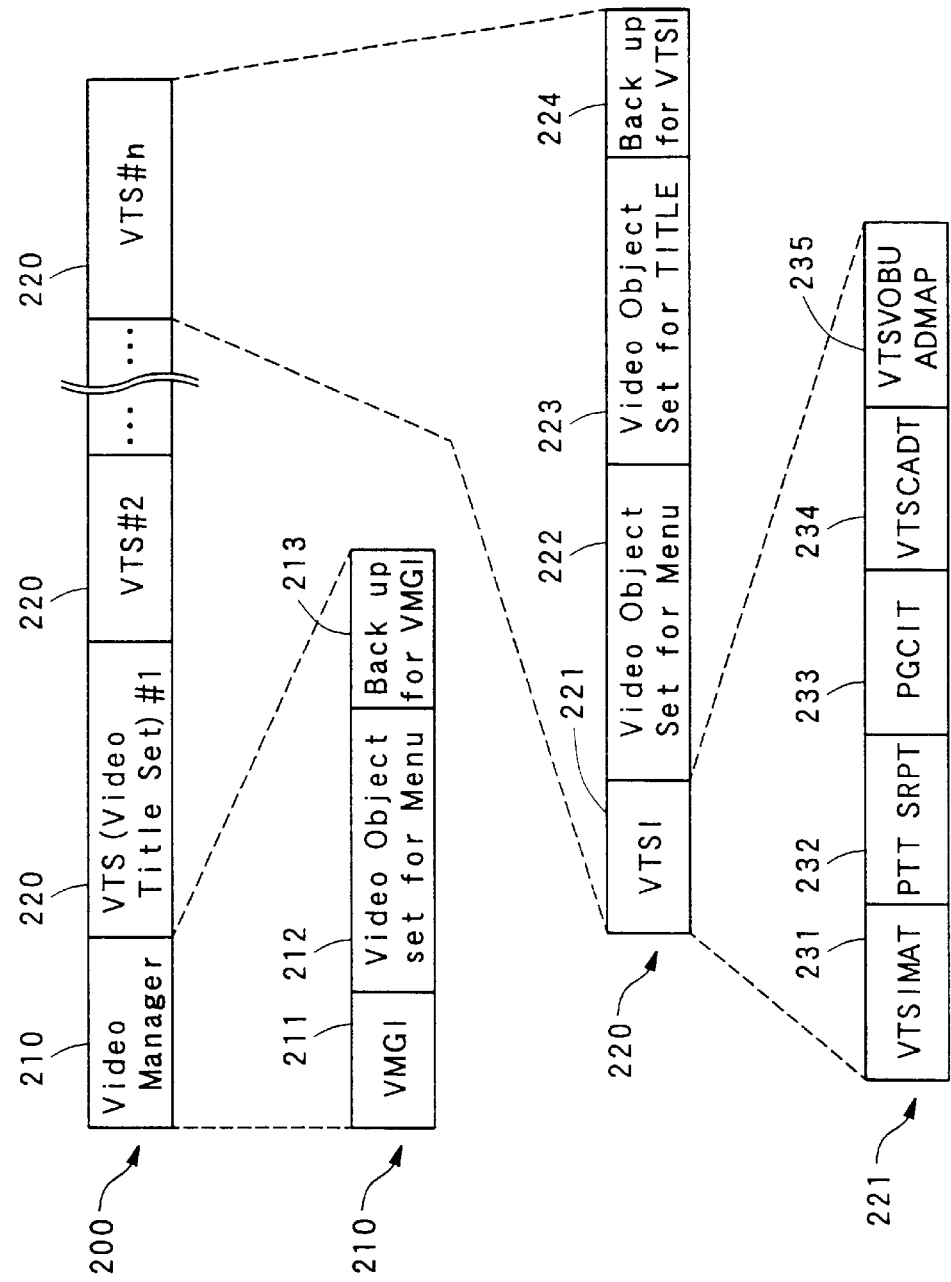
FIG. 1 is a diagram showing a data structure of application data recorded on a DVD in an embodiment of the present invention.

As shown in a top stage of FIG. 1, application data 200 has: one VMG (Video Manager) 210; and at least one VTS (Video Title Set) 220 for one volume.

As shown in a second top stage of FIG. 1, the VMG 210 has: control information VMGI (Video Manager Information) 211 for controlling a whole portion of one volume; a VOB (Video Object) set 212 for a title selection menu; and a backup for VMGI 213.

As shown in a third top stage of FIG. 1, the VTS 221 has: control information VTSI (Video Title Set Information) 221 for the pertinent VTS; a VOBS (Video Object Set) 222 for various menus within the VTS; a VOBS 223 for each title; and a backup for VTSI 224. Incidentally, each VOB set is a group of real time data such as video data, audio data and sub-picture data.

As shown in a bottom stage of FIG. 1, the VTSI 221 has: a VTSI MAT (VTSI Management Table) 231; a PTT SRPT (a PTT (Part of Title) Search Pointer Table) 232; a PGCIT (PGCI (Program Chain Information) Table) 233; a VTS C ADT (VTS menu Cell Address Table) 234; and a VTS VOBU ADMAP (VTS VOB Unit Address Map) 235. Incidentally, since a boundary of each table should be coincident with a boundary of a logical block, the size of each table in the VTSI is set to 2048 bytes.

The attributes of the real time data used in the present embodiment are described in the VTSI management table 231 within the above mentioned VTSI 221. More concretely, as shown in FIG. 2, the total number of the audio streams (which is "8" at the maximum) is described in 2 bytes at the address No. 514 and the address No. 515 in the VTSI management table 231 (in which 12 byte are assigned to each address). The attributes of the audio streams {e.g., the language codes (Japanese code/English code/French code etc.,), the audio coding modes (e.g., Dolby AC-3 mode/ MPEG audio mode/linear PCM mode etc.,), the audio application modes (karaoke (music accompaniment playing) mode/surround mode etc.,) and the quantization number (16 bits/20 bits/24 bits etc.,)}, which are the 8 audio streams at the maximum, are described in 64 bytes at the address No. 516 to the address No. 579, i.e., in 8 bytes for each audio stream.

Namely, the attribute information as for the audio stream No. 1 (hereinbelow, the audio stream No. n (n=1 to 8) is referred to as "ADS #n" as the occasion demands) is described in the 8 bytes from the address No. 516 to the address No. 523. The attribute information as for the ADS #2 is described in the 8 bytes from the address No. 524 to the address No. 531. In the same manner after that, in correspondence with the total number of the audio streams described in the address No. 514 and the address No. 515, the attribute information as for the ADS #3 to the ADS #8 at the maximum is described by the unit of 8 bytes.

The total number of the sub-picture streams is described in 2 bytes at the address No. 596 and the address No. 597. The attributes (e.g., the sub-picture coding modes, the language codes, etc.,) of the sub-picture streams, which are 32 streams at the maximum, are described in 6 bytes for each stream.

Namely, the attribute information as for the sub-picture stream No. 1 (hereinbelow, the sub-picture stream No. n (n=1 to 32) is referred to as "SDS #n" as the occasion demands) is described in the 6 bytes from the address No. 598 to the address No. 603. The attribute information as for the SDS #2 is described in the 6 bytes from the address No. 604 to the address No. 609. In the same manner after that, in correspondence with the total number of the sub-picture streams, the attribute information as for the SDS #3 to the SDS #32 at the maximum is described by the unit of 6 bytes.

In this way, by reading the information described at the address No. 514 to the address No. 579 and at the address No. 596 to address No. 789 in the VTSI management information table 231, it is possible to detect the attributes of the audio stream and the sub-picture stream (especially the language codes).

Incidentally, as shown in FIG. 2, the attributes of the video streams are given by the 2 bytes at the address No. 512 and the address No. 513 in the VTSI management information table 231, and are the data related to the data compression method (MPEG 1/MPEG 2) and the specification of the video data such as an aspect ratio, a bit rate and the like. No country code indicating a country where the pertinent movie has been produced or no language code thereof is described as the attributes of the video streams.

As explained above, as the attribute information for each data stream, no information related to the production place of the record information (contents) of the DVD is included. However, as for the audio stream, the audio stream No. 1 (ADS #1) is conventionally used as the audio stream for the original language. Namely, if it is a Japanese movie, the audio data in Japanese is recorded in the ADS #1. The present embodiment uses the language code of the original language conventionally recorded in the ADS #1 as the attribute information related to the production place of the content.

Next, the information reproducing apparatus of the present embodiment for selectively reproducing the audio stream and the sub-picture stream from the above described DVD will be explained with reference to FIG. 3 to FIG. 5.

Figure 3:
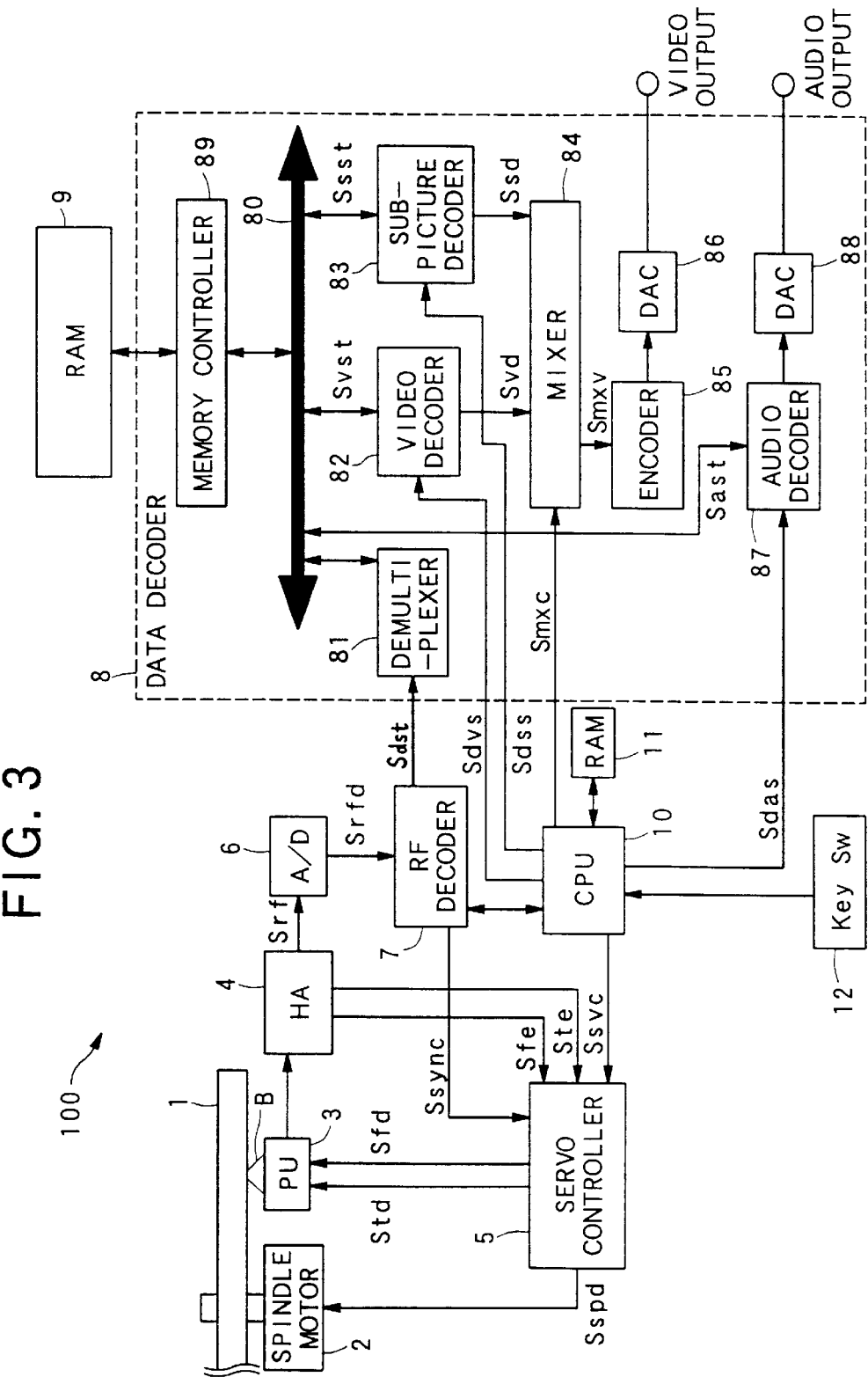
FIG. 3 is a block diagram of an information reproducing apparatus 100 as an embodiment of the present invention.

In FIG. 3, an information reproducing apparatus 100 for reproducing an optical disc 1 is provided with a spindle motor 2, an optical pickup (PU) 3, a head amplifier (HA) 4, a servo controller 5, an A/D (Analog to Digital) converter 6, an RF (Radio Frequency) decoder 7, a data decoder 8, a RAM (Random Access Memory) 9, a CPU (Central Processing Unit) 10, an RAM 11 and a key switch (Key SW) 12.

The spindle motor 2 rotates the DVD 1 loaded on a turn table not shown at a predetermined linear speed based on a spindle control signal Sspd supplied from the servo controller 5.

The pickup 3 emits a laser beam B onto the DVD 1 and receives a reflection light of the laser beam B from the information record surface of the DVD 1, to output an electric signal corresponding to the received light amount to the head amplifier 4.

The head amplifier 4 applies a predetermined operation to the electric signal supplied from the pickup 3 and generates a focus error signal Sfe and a tracking error signal Ste to output them to the servo controller 5, while generating an RF signal Srf including a signal component corresponding to a refracted light component retracted by the pit array, which carries the record information, formed on the DVD 1 to output it to the A/D converter 6.

The servo controller 5 forms a servo loop in accordance with a servo control signal Ssvc from the CPU 10, outputs a focus actuator driving signal Sfd based on the focus error signal Sfe supplied from the head amplifier 4 to a focus error actuator (not shown) in the pickup 3, and also output a tracking actuator driving signal Std based on the tracking error signal Ste supplied from the head amplifier 4 to a tracking actuator (not shown) in the pickup 3. Further, the servo controller 5 detects a frequency difference and a phase difference between a synchronization signal Ssync, which is synchronous with a rotation of the DVD 1 and is supplied from the RF decoder 7, and a standard signal not shown, and generates a spindle control signal Sspd based on the frequency difference and the phase difference to output it to the spindle motor 2.

By the action of the servo controller 5, the laser beam B is controlled so that the laser beam B is focused on the information record surface of the DVD 1, which is rotation-driven at a predetermined linear speed prescribed by the above mentioned standard signal, and exactly traces the pit array for carrying the record information.

On the other hand, the RF signal Srf supplied from the head amplifier 4 to the A/D converter 6 is converted to a digital RF signal Srfd and is outputted to the RF decoder 7.

The RF decoder 7 detects the synchronization signal Ssync out of the digital RF signal Srfd supplied from the A/D converter 6, and outputs it to the servo controller 5. The RF decoder 7 performs a decoding process and an error correcting process based on a recording modulation method such as an 8/16 modulation, for example which has been applied to the record information at the time of recording the record information onto the DVD 1, so as to decode the digital RF signal Srfd to a record information data stream Sdst having the data structure shown in FIG. 1 including the video data, the audio data and the sub-picture data. The decoded record information data stream Sdst is outputted to the data decoder 8.

The RF decoder 7 also extracts the aforementioned VTSI from among the record information data stream Sdst, and outputs it according to a request from the CPU 10.

The data decoder 8 extracts the video stream, the audio stream and the sub-picture stream from among the record information data stream Sdst which is supplied the RF decoder 7, and generates the video data, the audio data and the sub-picture data after performing the decoding process based on the predetermined coding method which is prescribed for each stream.

More concretely, by the demultiplexer 81, a video stream Svst, an audio stream Sast and a sub-picture stream Ssst are distinguished and extracted from the record information stream Sdst supplied from the RF decoder 7. The video stream Svst is supplied to the video decoder 82, the audio stream Sast is supplied to the audio decoder 87, and the sub-picture stream Ssst is supplied to the sub-picture decoder 83 respectively through the data bus 80, the memory controller 89 and the RAM 9.

The audio decoder 87 performs a decoding process of one of the audio streams, which are the 8 streams at the maximum, supplied from the demultiplexer 81 on the basis of a decode control signal Sdas for the audio stream (e.g., the stream number and the code of the coding method such as the Dolby-AC3 method, the MPEG audio method, the linear PCM method or the like) supplied from the CPU 10, to generate the audio data and output it to the D/A converter (DAC) 88.

The video decoder 82 performs a decoding process of the video stream supplied from the demultiplexer 81 on the basis of a decode control signal Sdvs for the video stream (e.g., the code of the coding method such as the MPEG1 method, the MPEG2 method or the like) supplied from the CPU 10, to generate the video data Svd and output it to the mixer 84.

The sub-picture decoder 83 performs a decoding process of one of the sub-picture streams, which are the 32 streams at the maximum, supplied from the demultiplexer 81 on the basis of a decode control signal Sdss for the sub-picture stream (e.g., the stream number and the code of the coding method such as the run length compression method or the like) supplied from the CPU 10, to generate a sub-picture data Ssd and output it to the mixer 84.

Figure 4:
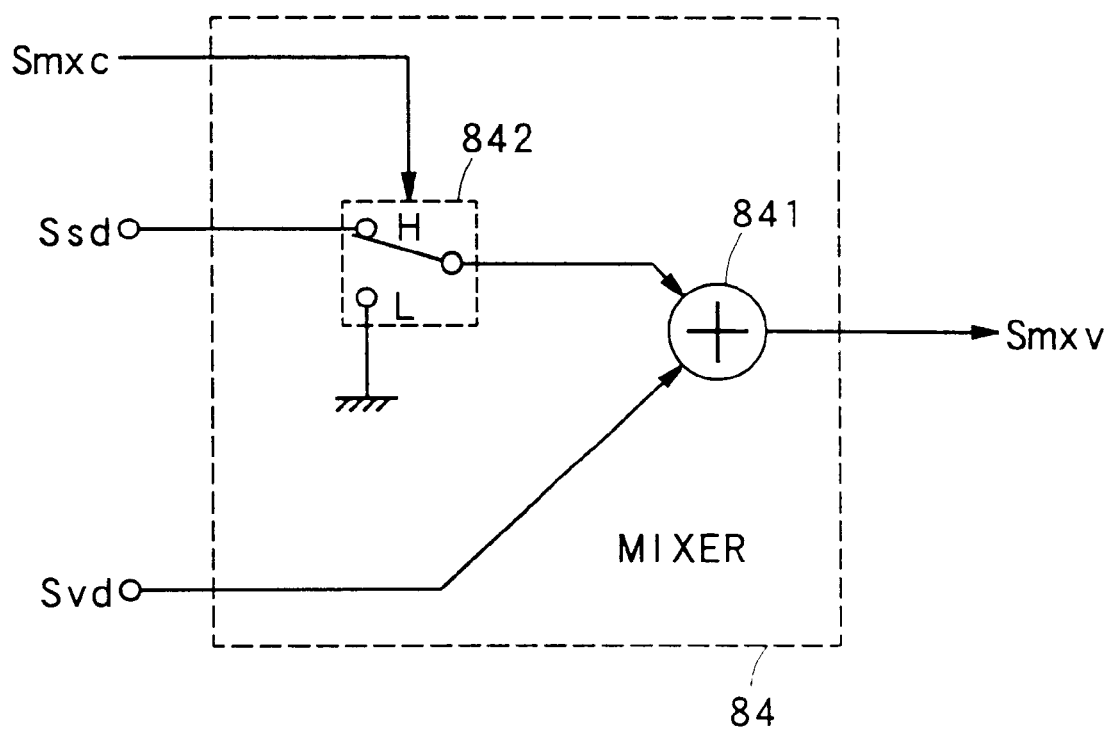
FIG. 4 is a diagram showing a concrete structure of a mixer 84 in the information reproducing apparatus 100 of FIG. 3.

As shown in FIG. 4, the mixer 84 is provided with an adder 841 and a switch 842. The video data Svd is supplied from the video decoder 82 to one of the input terminals of the adder 841, and the other terminal of the adder 841 is connected to the output terminal of the switch 842. To one of the input terminals (H terminal) of the switch 842, the sub-picture data Ssd outputted from the sub-picture decoder 83 is supplied. The other input terminal (L terminal) of the switch 842 is grounded. To the control input terminal of the switch 842, a superimpose control signal Smxc, which is described later in detail, outputted from the CPU 10 is supplied.

In FIG. 3 again, by the above described construction of the mixer 84, when the superimpose control signal Smxc at the H level is supplied from the CPU 10 to the mixer 84, the mixer 84 superimposes the sub-picture data Ssd onto the video data Svd and outputs it as a superimposed video data Smxv to the encoder 85. When the superimpose control signal Smxc at the L level is supplied from the CPU 10 to the mixer 84, the mixer 84 does not superimposes the sub-picture data Ssd onto the video data Svd and outputs the video data Svd itself as a superimposed video data Smxv to the encoder 85.

The encoder 85 encodes the superimposed video data Smxv supplied thereto to video format data based on a predetermined television standard such as the NTSC, the PAL or the like, and outputs it to the D/A converter (DAC) 86.

The DAC 86 converts the video format data supplied thereto into an analog signal and outputs it as a video output signal to a monitor etc., which is not shown in the figure.

The CPU 10 outputs the servo control signal Ssvc to the servo controller 5 so as to obtain a reproduction condition corresponding to an operation command supplied from the key switch 12, which is operated by the audience. Further, the CPU 10 reads each attribute information of the video data, the audio data and the sub-picture data described in the VTSI management information table 231 at the address No. 512 to the address No. 789, from the VTSI of the data stream supplied from the RF decoder 7, so as to generate the decode control signals Sdas, Sdvs and Sdss corresponding to each attribute information as well as the superimpose control signal Smxc and output them to the data decoder 8, and also perform the operation control related to the information reproducing operation of a whole portion of the information reproducing apparatus 100.

The CPU 10 is provided with the RAM 11 as one example of the first and second memory devices, and the CPU 10 performs the writing/reading control of the attribute information, which is supplied from the key switch 12, and the attribute information of each stream supplied from the RF decoder 7 with respect to the RAM 11.

By the construction described above, the video data, the sub-picture data and the audio data read from the DVD 1 are outputted as the analog video signal and the analog audio signal from the information reproducing apparatus 100.

Next, the automatic selecting operation of the audio stream and the sub-picture stream, which is performed by the CPU 10 having the above mentioned construction, is explained with reference to FIG. 5.

Figure 5:
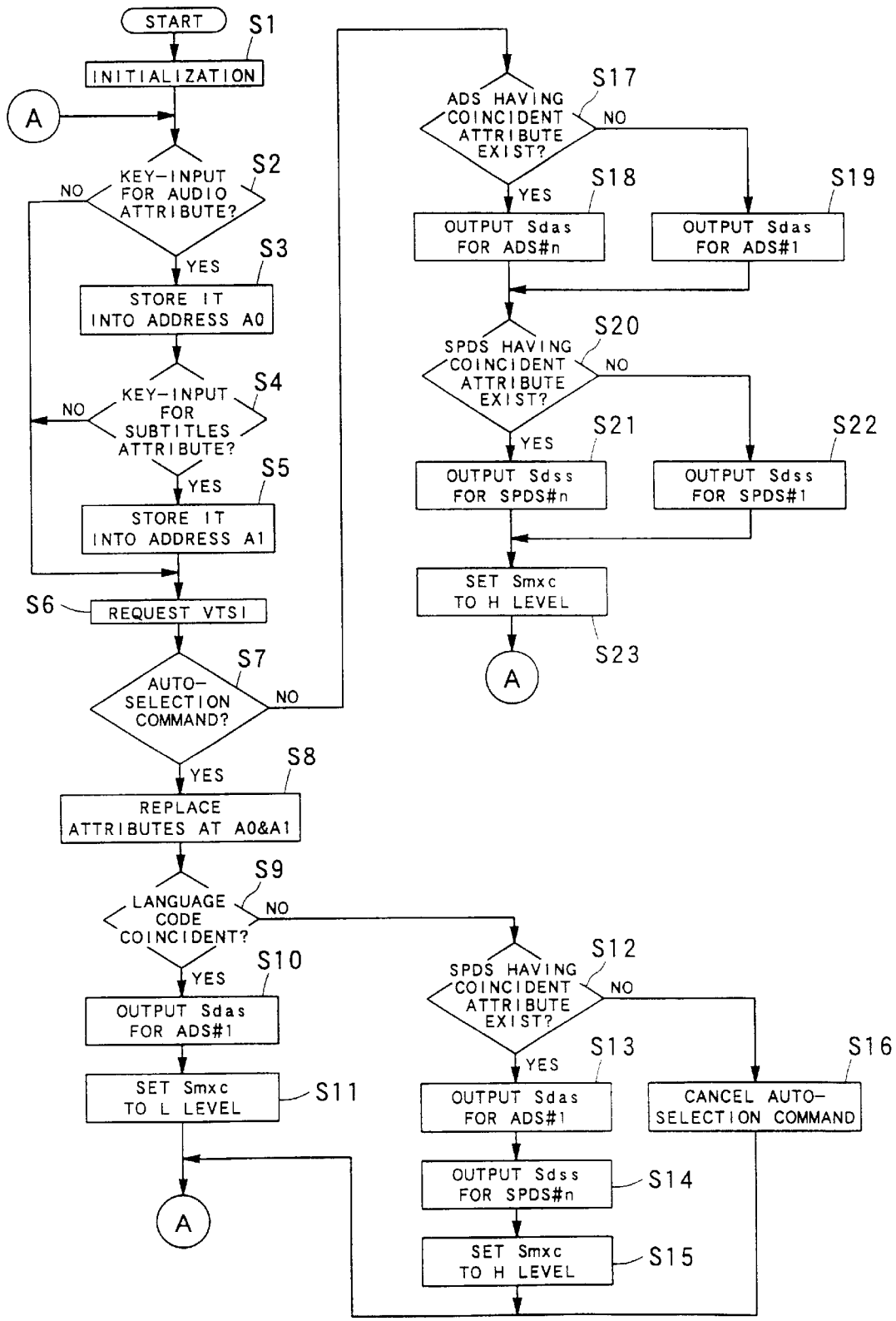
FIG. 5 is an operation flow chart showing an automatic selecting operation of a CPU 10 of the information reproducing apparatus 100 of FIG. 3.

In FIG. 5, it is assumed that the CPU 10 has already supplied the servo control signal Ssvc to the servo controller 5. Namely, it is assumed that the pickup 3 is in a condition capable of reading the record information recorded on the DVD 1 by the spindle control, the focus control and the tracking control by the servo controller 5 on the basis of the servo control signal Ssvc.

In such a condition, the CPU 10 firstly performs the initialization so that the language codes as the initial values are respectively set to the address A0 of the RAM 11, as the first memory device for storing the attribute of the audio stream to be reproduced, and the address A1 of the RAM 11, as the second memory device for storing the attribute of the sub-picture stream (i.e., the. subtitles) to be reproduced. For example, English is set to the address A0 (for the audio stream) and Japanese is set to the address A1 (for the sub-picture stream) (step S1).

Incidentally, as the predetermined attributes (i.e., the language codes) used in a step S8 when the automatic selection command is issued at a step S7 as described later in detail, the language code (e.g., Japanese) corresponding to the destination (e.g., the country) of forwarding or shipping is stored beforehand in the RAM 11 at an address A2 by the producer of the pertinent information reproducing apparatus 100 at the time of forwarding or shipping the pertinent information reproducing apparatus 100.

Next, by the CPU 10, it is judged whether or not the language code of the audio data to be reproduced is inputted by the audience through the key switch 12 (step S2). If it is not inputted (step S2: NO), the operation flow branches to a step S6. If it is inputted (step S2: YES), the key-inputted language code is stored into the RAM 11 at the address A0 in place of the initialized language code for the audio data set in the step S1 (step S3).

In the same manner, by the CPU 10, it is judged whether or not the attribute of the subtitles (i.e., the language code for the subtitles) is inputted by the audience through the key switch 12 (step S4). If it is not inputted (step S4: NO), the operation flow branches to the step S6. If it is inputted (step S4: YES), the key-inputted language code is stored into the RAM 11 at the address A1 in place of the initialized language code for the subtitles set in the step S1 (step S5).

Then, the CPU 10 requests the supply of the VTSI for the real time data (VTS) on the DVD 1 which is being read by the pickup 3 with respect to the RF decoder 7 (step S6).

Then, by the CPU 10, it is judged whether or not the automatic selection command is issued by the audience through the key switch 12 (step S7). If it is not issued (step S7: NO), the CPU 10 compares the language code of each of the audio streams, which are described at the address No. 516 to the address No. 579 of the VTSI management information table (VTSIMAP) of the VTSI supplied at the step S6, with the language code stored in the RAM 11 at the address A0, so as to judge whether or not the audio stream (ADS) having the language code coincident with the language code stored in the RAM 11 at the address A0 exists (step S17).

At the step S17, if the ADS exists (step S17: YES), the decode control signal Sdas to selectively decode the audio stream ADS#n which is judged to be coincident as the audio stream to be reproduced is outputted to the audio decoder 87 (step S18).

On the other hand, at the step S17, if the ADS does not exists (step S17: NO), the decode control signal Sdas to selectively decode the audio stream ADS#1 as the audio stream to be reproduced is outputted to the audio decoder 87 (step S19).

Then, the CPU 10 compares the language code of each of the sub-picture streams, which are described at the address No. 598 to the address No. 789 of the VTSI management information table (VTSIMAP) 231 of the VTSI supplied at the step S6, with the language code stored in the RAM 11 at the address A1, so as to judge whether or not the sub-picture stream (SPDS) having the language code coincident with the language code stored in the RAM 11 at the address A1 exists (step S20).

At the step S20, if the SPDS exists (step S20: YES), the decode control signal Sdss to selectively decode the sub-picture stream SPDS#n which is judged to be coincident as the sub-picture stream to be reproduced is outputted to the sub-picture decoder 83 (step S21).

On the other hand, at the step S20, if the SPDS does not exists (step S20: NO), the decode control signal Sdss to selectively decode the sub-picture stream SPDS#1 as the sub-picture stream to be reproduced is outputted to the sub-picture decoder 83 (step S22).

Then, the CPU 10 outputs the superimpose control signal Smxc at the H level to the mixer 84 so as to superimpose the sub-picture data selected at the step S21 or S22 as the subtitles onto the video data (step S23). After that, the operation flow returns to the step S2 so as to prepare for an operation of setting a new language code by the audience.

By the steps described above, the setting operation in a case where the automatic selection command is not issued (step S7: NO) i.e., the setting operation related to the selective reproducing operation in accordance with the language codes of the audio stream and the sub-picture stream set by the audience is performed.

Next, the automatic selective reproducing operation is explained.

At the step S7, if the automatic selection command is issued i.e., the automatic selection reproduction is specified (step S7: YES), the language code of the audio data stored in the RAM 11 at the address A0 and the language code of the sub-picture data stored in the RAM 11 at the address A1 in the steps S2 to S5 are replaced by a predetermined language code stored in the RAM 11 at the address A2. Namely, the storage contents of the RAM 11 at the addresses A0 and A1 are updated so that the language code of the audio data and the language code of the sub-picture data are coincident with each other (step S8). For example, in case of the information reproducing apparatus which is manufactured for Japan and whose main audience is supposed to be Japanese, the predetermined language code is set to the language code corresponding to Japanese and is stored into the RAM 11 at the addresses A0 and A1.

Then, by the CPU 10, it is judged whether or not the language code of the audio stream #1 (ADS #1), which is described at the address No. 516 to the address No. 523 of the VTSI management information table (VTSIMAP) of the VTSI supplied at the step S6, is coincident with the language code stored in the RAM 11 at the address A0 i.e., the predetermined language code (which is Japanese in the present embodiment) (step S9).

At the step S9, if the language code is judged to be coincident (step S9: YES), the decode control signal Sdas to select the ADS#1 as the audio stream to be reproduced is outputted to the audio decoder 87 (step S10), and the superimpose control signal Smxc at the L level is outputted to the mixer 84, so as to prohibit the superimpose of the sub-picture data Ssd to be the subtitles onto the video data Svd (step S11). After that, the operation flow returns to the step S2 so as to prepare for an operation of setting a new language code by the audience.

By the steps described above (from the step S7 to the step S11), the audio data recorded in the audio stream No. 1 is outputted as the audio signal while the video signal on which the subtitles are not superimposed is outputted from the information reproducing apparatus 100.

Since the ADS #1 is conventionally used as the audio stream for the original language for a record information (e.g., a movie), the language code of the ADS #1 is used as the attribute information related to the production place or area (e.g., the country) of the record information. For example, in case that the record information is a Japanese movie, the attribute of the ADS #1 is conventionally Japanese. Therefore, since the attribute of the ADS #1 is coincident with the attribute stored in the RAM 11 at the address A0 at the step S8, the automatic selection is performed such that the audio decoder selectively decodes the ADS #1 whose attribute is Japanese without superimposing the subtitles.

In this way, by setting the language code corresponding to the mother tongue of the main audience as the predetermined language code, it is prohibited to superimpose the subtitles on the video data by the operations from the step S7 to the step S11, since the subtitles are not necessary if the language code of he ADS #1 is coincident with the language code corresponding to the mother tongue.

On the other hand, at the step S9, if the language code is not judged to be coincident (step S9: NO), the CPU 10 compares the language code of each of the sub-picture streams (SPDS), which are described at the address No. 598 to the address No. 789 of the VTSI management information table (VTSIMAP) 231 of the VTSI 221 supplied at the step S6, with the language code stored in the RAM 11 at the address A1 at the step S8, so as to judge whether or not the sub-picture stream (SPDS) having the language code coincident with the language code stored in the RAM 11 at the address A1 exists (step S12).

At the step S12, if the SPDS exists (step S12: YES), the decode control signal Sdas to selectively decode the audio stream ADS#1 as the audio stream to be reproduced is outputted to the audio decoder 87 (step S13). Then, the decode control signal Sdss to selectively decode the sub-picture stream SPDS #n which is judged to be coincident at the step S12 as the sub-picture stream to be reproduced is outputted to the sub-picture decoder 83 (step S14).

Then, the CPU 10 outputs the superimpose control signal Smxc at the H level to the mixer 84 so as to superimpose the sub-picture data selected at the step S14 as the subtitles onto the video data (step S15). After that, the operation flow returns to the step S2 so as to prepare for an operation of setting a new language code by the audience.

By the steps described above, the audio data recorded on the ADS #1 of the DVD 1 is outputted as the audio signal while the video signal, on which the subtitles corresponding to the attribute (the language code) stored in the RAM 11 at the address A1 are superimposed, is outputted from the information reproducing apparatus 100.

For example, supposing that the record information is an American movie, since the attribute of the ADS #1 is conventionally English, it is different from the attribute which is stored in the RAM 11 at the address A0 at the step S8 (i.e., Japanese). Thus, the automatic setting is done such that the audio decoder selectively decodes the ADS #1 whose attribute is English (the original language of the record information) while superimposing the subtitles whose attribute is Japanese.

Namely, in the steps S9 to S15, since the language code of the ADS #1, which is assumed to be the audio stream for the original language of the record information, and the predetermined language code corresponding to the mother tongue of the main audience is different from each other, it is judged that a language different from the mother tongue of the audience is used as the original language of the recorded information, so as to control superimposing the subtitles of the mother tongue of the audience.

On the other hand, if the sub-picture stream having the language code coincident with the predetermined language code does not exist at the step S12 (step S12: NO), the automatic selection command set at the step S7 is canceled (step S16). Then, the operation flow returns to the step S2 so as to perform the selection based on the conventional setting operation.

Incidentally, in the above explanation, although the predetermined attribute (the language code) is stored in the RAM 11 at the address A2 in advance of forwarding or shipping the information reproducing apparatus 100, the predetermined attribute may be specified by the audience. In this case, even if the information reproducing apparatus is directed for a specific country (e.g., Japan), the automatic selection as described above is performed. Namely, regardless of the destination of forwarding or shipping the information reproducing apparatus (the country where the audience uses the information reproducing apparatus 100), the automatic selection operation of the present invention can be performed in the above described manner.

In the above explanation, although the storage contents of the first and second memory devices are replaced by the predetermined language code at the step S8 when the automatic selection command is issued at the step S7, the predetermined language code may be stored in advance of the setting operation for the language code at the steps S2 to S5 if the audience is willing to perform the automatic selection operation from the beginning. In this case, the step S8 can be omitted.

In the above explanation, although the language code stored in the RAM 11 at the address A0 which is one example of the first memory device is compared with the language code of the ADS #1, the language code stored in the RAM 11 at the address A1 which is one example of the second memory device i.e., the language code set for the sub-picture stream may be compared with the language code of the ADS #1. In this case, since the language code set for the audio stream and the language code set for the sub-picture stream are coincident with each other in the automatic selection operation, the same effect can be obtained.

In the above explanation, although the language code of the ADS #1 as the predetermined code is compared with the language code stored in the RAM 11 by making the good use of the fact that the ADS #1 is conventionally used as the audio stream for the original language as for the record information, the language code recorded on the stream having a stream number other than #1 may be used as the predetermined language code if it is possible to rule the audio stream for the original language related to the record information beforehand between the producer of the record information and the producer of the information reproducing apparatus 100.

In the above explanation, although the record medium is a disc based on the recording format of the DVD i.e., a disc based on a format in which the original language information of the record information is not recorded, if the record medium is based on the format which allows recording the original language information beforehand, this recorded original language information may be utilized as the predetermined language code.

Further, in the above explanation, although the automatic selection reproduction is performed with respect to the record information recorded on the record medium (e.g., the DVD), the present invention can be adapted to a case where the record information is transmitted by a wire or wireless communication.

As described above in detail, according to the present embodiment, the language code which is the attribute information for the ADS #1, which is conventionally used as the audio stream for the original language related to the recorded video information, as the predetermined language code is compared with the language code stored in the RAM 11 at the address A0 as one example of the first memory device, so that the superimpose of the subtitles on the video information is prohibited if they are coincident with each other. Namely, by storing the attribute corresponding to the mother tongue of the audience in the RAM 11 at the address A0, the audio information in the audio stream carrying the original language is automatically reproduced in case that the information to be reproduced (e.g., a movie) is produced mainly with the mother tongue of the audience, while the superimpose of the subtitles on the video information is prohibited. Therefore, it is possible to reduce the troublesome of setting the attributes again in accordance with the content of the information to be reproduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-367156 filed on Dec. 25, 1997 including the specification, claims, drawings and summary is incorporated herein by reference in its entirety.

What is claimed is:

1. An information reproducing apparatus for reproducing record information from a record medium on which video information, a plurality of audio-information-streams of audio information related to the video information and a plurality of character-information-streams of character information related to the video information are recorded as the record information, said information reproducing apparatus comprising:

a video information reproducing device for reproducing the video information;

a first memory device for storing an attribute of the audio information to be reproduced;

a second memory device for storing an attribute of the character information to be reproduced;

an audio information reproducing device for reproducing the audio information in one of the audio-information-streams corresponding to the attribute stored in the first memory device;

a character information reproducing device for reproducing the character information in one of the character-information-streams corresponding to the attribute stored in the second memory device;

a superimposing device for superimposing the character information on the video information;

an attribute distinguishing device for distinguishing the attribute of particular one of the audio-information-streams; and a superimpose controlling device for comparing the attribute stored in the first memory device and the attribute distinguished by said attribute distinguishing device with each other, and prohibiting said superimposing device to superimpose the character information on the video information if the compared attributes are coincident with each other.

2. An information reproducing apparatus according to claim 1, further comprising a specifying device for specifying a reproduction mode comprising an automatic selection reproduction mode, said superimpose controlling device allowing said superimposing device to superimpose the character information regardless of a result of comparison of the attributes if the automatic selection reproduction mode is not specified by said specifying device.

3. An information reproducing apparatus according to claim 1, wherein the particular one of the audio-information-streams is an audio-information-stream, which has a stream number 1, among the audio-information-streams.

4. An information reproducing apparatus for reproducing record information from a record medium on which video information, a plurality of audio-information-streams of audio information related to the video information and a plurality of character-information-streams of character information related to the video information are recorded as the record information, said information reproducing apparatus comprising:

a video information reproducing device for reproducing the video information;

a first memory device for storing an attribute of the audio information to be reproduced;

a second memory device for storing an attribute of the character information to be reproduced;

an audio information reproducing device for reproducing the audio information in one of the audio-information-streams corresponding to the attribute stored in the first memory device;

a character information reproducing device for reproducing the character information in one of the character-information-streams corresponding to the attribute stored in the second memory device;

a superimposing device for superimposing the character information on the video information;

an attribute distinguishing device for distinguishing the attribute of particular one of the character-information-streams; and a superimpose controlling device for comparing the attribute stored in the first memory device and the attribute distinguished by said attribute distinguishing device with each other, and prohibiting said superimposing device to superimpose the character information on the video information if the compared attributes are coincident with each other.

5. An information reproducing apparatus for reproducing record information from a record medium on which video information, a plurality of audio-information-streams of audio information related to the video information and a plurality of character-information-streams of character information related to the video information are recorded as the record information, said information reproducing apparatus comprising:

a video information reproducing device for reproducing the video information;

a first memory device for storing an attribute of the audio information to be reproduced;

a second memory device for storing an attribute of the character information to be reproduced;

an audio information reproducing device for reproducing the audio information in one of the audio-information-streams corresponding to the attribute stored in the first memory device;

a character information reproducing device for reproducing the character information in one of the character-information-streams corresponding to the attribute stored in the second memory device;

a superimposing device for superimposing the character information on the video information;

an attribute distinguishing device for distinguishing the attribute of particular one of the audio-information-streams;

a comparing device for comparing the attribute stored in the first memory device and the attribute distinguished by said attribute distinguishing device with each other; and a reproduction controlling device for controlling said audio information reproducing device to reproduce the audio information in the particular one of the audio-information-streams if the compared attributes are not coincident with each other according to a comparison result of said comparing device.

6. An information reproducing apparatus according to claim 5, wherein the particular one of the audio-information-streams is an audio-information-stream, which has a stream number 1, among the audio-information-streams.

7. An information reproducing apparatus for reproducing record information from a record medium on which video information, a plurality of audio-information- streams of audio information related to the video information and a plurality of character-information-streams of character information related to the video information are recorded as the record information, said information reproducing apparatus comprising:

a video information reproducing device for reproducing the video information;

a first memory device for storing an attribute of the audio information to be reproduced;

a second memory device for storing an attribute of the character information to be reproduced;

an audio information reproducing device for reproducing the audio information in one of the audio-information-streams corresponding to the attribute stored in the first memory device;

a character information reproducing device for reproducing the character information in one of the character-information-streams corresponding to the attribute stored in the second memory device;

a superimposing device for superimposing the character information on the video information;

an attribute distinguishing device for distinguishing the attribute of particular one of the audio-information-streams; and a controlling device for comparing the attribute stored in the first memory device and the attribute distinguished by said attribute distinguishing device with each other, prohibiting said superimposing device to superimpose the character information if the compared attributes are coincident with each other and allowing said audio information reproducing device to reproduce the audio information in the particular one of the audio-information-streams if the compared attributes are not coincident with each other 8. An information reproducing apparatus according to claim 7, wherein the particular one of the audio-information-streams is an audio-information-stream, which has a stream number 1, among the audio-information-streams.

* * * * *